United States Patent
Hughes

(10) Patent No.: US 11,552,344 B2
(45) Date of Patent: Jan. 10, 2023

(54) FLEX FOIL SUBSTRATE CONNECTOR FOR SENSING BATTERY VOLTAGE AND TEMPERATURE

(71) Applicant: Gentherm Inc., Northville, MI (US)

(72) Inventor: Timothy Hughes, South Lyon, MI (US)

(73) Assignee: GENTHERM GMBH, Odelzhausen (DE)

( * ) Notice: Subject to any disclaimer, the term of this patent is extended or adjusted under 35 U.S.C. 154(b) by 300 days.

(21) Appl. No.: 16/805,139

(22) Filed: Feb. 28, 2020

(65) Prior Publication Data

US 2021/0273273 A1    Sep. 2, 2021

(51) Int. Cl.
| | |
|---|---|
| H01M 10/48 | (2006.01) |
| H01M 50/502 | (2021.01) |
| G01K 7/16 | (2006.01) |
| G01K 13/00 | (2021.01) |
| H02G 5/02 | (2006.01) |

(52) U.S. Cl.
CPC ............ *H01M 10/486* (2013.01); *G01K 7/16* (2013.01); *G01K 13/00* (2013.01); *H01M 10/482* (2013.01); *H01M 50/502* (2021.01); *H02G 5/02* (2013.01); *H01M 2220/20* (2013.01)

(58) Field of Classification Search
CPC ............ H01M 10/486; H01M 50/502; H01M 10/482; H01M 2220/20; G01K 7/16; G01K 13/00; H02G 5/02
USPC ........................................................ 429/90
See application file for complete search history.

(56) References Cited

U.S. PATENT DOCUMENTS

| | | | |
|---|---|---|---|
| 231,320 A | * | 8/1880 | Heck .................... F22B 21/065 122/222 |
| 7,919,027 B2 | | 4/2011 | Nordlinder et al. |
| 2016/0197330 A1 | * | 7/2016 | Takase ............... H01M 50/528 429/92 |
| 2016/0380319 A1 | * | 12/2016 | Rhein ................ H01M 50/147 429/90 |
| 2018/0034115 A1 | * | 2/2018 | Li ...................... H01M 10/482 |
| 2018/0045577 A1 | | 2/2018 | Sun |
| 2019/0237817 A1 | * | 8/2019 | Hammerschmied ........................ H01M 10/625 |

OTHER PUBLICATIONS

International Search Report and Written Opinion dated Jun. 25, 2021 corresponding to International Application No. PCT/US2021/014521, 16 pages.

\* cited by examiner

*Primary Examiner* — Maria Laios
*Assistant Examiner* — Paul Christian St Wyrough

(57) ABSTRACT

A sensing system for a battery includes a flex foil substrate including a first cover layer. A conductive layer defines a trace pattern including traces. A second cover layer defines a first opening. The conductive layer is sandwiched between the first cover layer and the second cover layer. The first opening exposes a first trace and a second trace of the trace pattern. A busbar is attached to the first cover layer of the flex foil substrate. A temperature sensor is connected to the first trace and the second trace of the trace pattern in the first opening of the first cover layer.

17 Claims, 4 Drawing Sheets

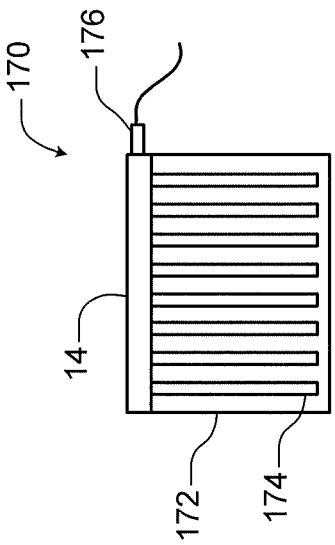
FIG. 4A
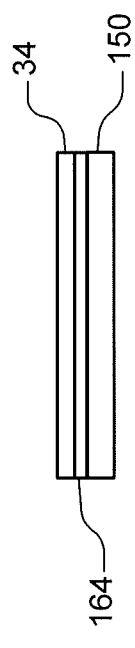
FIG. 4B
FIG. 5
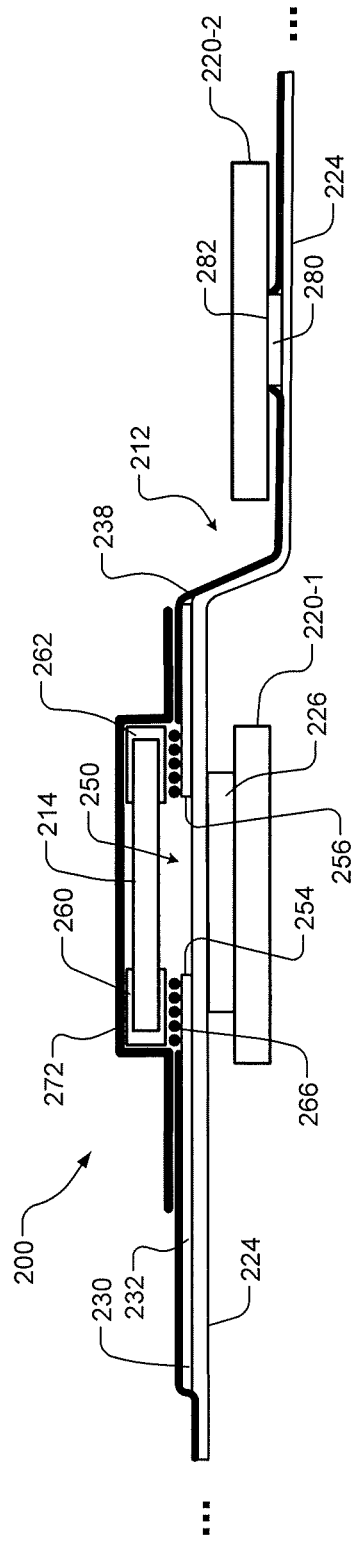
FIG. 6

FLEX FOIL SUBSTRATE CONNECTOR FOR SENSING BATTERY VOLTAGE AND TEMPERATURE

FIELD

The present disclosure relates to electrical connectors and more particularly to electrical connectors for battery systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Hybrid vehicles include an internal combustion engine (ICE), an electric motor, and a battery system. Depending on the situation, the ICE, the electric motor or both can be used to drive the vehicle. Pure electric vehicles include an electric motor and a battery system and do not include an ICE. The battery systems in hybrid and electric vehicles generally have higher storage capacities as compared to conventional vehicles that are solely propelled by ICEs.

To provide higher storage capacity, the battery systems include one or more batteries that are connected together. Each of the batteries, in turn, includes one or more battery cells. Sophisticated control and monitoring techniques are increasing being used to control these battery systems. For example, during operation, additional battery parameters such as current, voltage, temperature and/or charge state are measured and monitored. As a result, multiple connections may be made to each of the batteries. Operation of the battery system is adjusted based on the monitored parameters.

SUMMARY

A sensing system for a battery includes a flex foil substrate including a first cover layer. A conductive layer defines a trace pattern including traces. A second cover layer defines a first opening. The conductive layer is sandwiched between the first cover layer and the second cover layer. The first opening exposes a first trace and a second trace of the trace pattern. A busbar is attached to the first cover layer of the flex foil substrate. A temperature sensor is connected to the first trace and the second trace of the trace pattern in the first opening of the first cover layer.

In other features, the busbar is attached to the first cover layer of the flex foil substrate using pressure sensitive adhesive. The temperature sensor includes a negative temperature coefficient (NTC) temperature sensor. The temperature sensor is attached to the first trace and the second trace using conductive adhesive. A protective layer is arranged over the temperature sensor and the first opening in the flex foil substrate.

In other features, the protective layer comprises a coating. The protective layer comprises a conformal coating. A battery system includes a frame, a plurality of busbars including the busbar and the sensing system. The plurality of busbars are attached to the frame.

In other features, the flex foil substrate is arranged in contact with a top surface of the busbar. The flex foil substrate includes a third trace and a second opening in the second cover layer. The third trace is connected through the second opening to a bottom surface of at least another one of the plurality of busbars.

In other features, the third trace of the flex foil substrate is ultrasonically welded to the third trace. The busbar and the at least another one of the plurality of busbars are arranged adjacent to one another.

A connector for a battery system includes a frame and a plurality of busbars attached to the frame. A flex foil substrate includes a first cover layer, a second cover layer and a conductive layer defining a trace pattern including traces and sandwiched between the first cover layer and the second cover layer. A first opening in the second cover layer exposes a first trace and a second trace of the trace pattern. A second opening in the second cover layer exposing a third trace of the trace pattern. An outer surface of the first cover layer attached to a first surface of a first one of the plurality of busbars. The third trace of the flex foil substrate in the second opening is connected to a second surface of a second one of the plurality of busbars. A temperature sensor is connected in the first opening to the first trace and the second trace of the trace pattern.

In other features, the second surface of the second one of the plurality of busbars is on a battery-facing side of the connector and the first surface of the first one of the plurality of busbars is on a side opposite to the battery-facing side of the connector. The first one of the plurality of busbars is attached to the first cover layer of the flex foil substrate using pressure sensitive adhesive. The temperature sensor includes a negative temperature coefficient (NTC) temperature sensor. The temperature sensor is attached to the first trace and the second trace using conductive adhesive. A protective layer is arranged over the temperature sensor and the first opening in the flex foil substrate.

In other features, the protective layer comprises a coating. The protective layer comprises a conformal coating.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4A is a plan view of an example of a printed circuit board according to the present disclosure;

FIG. 4B is a side view illustrating an example of the printed circuit board connected to the flex foil substrate using conductive adhesive according to the present disclosure;

FIG. 5 is a side cross-sectional view of a battery including a plurality of battery cells according to the present disclosure; and FIG. 6 is a side cross-sectional view of the flex foil substrate of FIG. 2 connected to a temperature sensor and busbars of a battery system according to the present disclosure.

In the drawings, reference numbers may be reused to identify similar and/or identical elements.

DETAILED DESCRIPTION

As described above, the temperature of components of a battery system may be measured for several reasons. For example, charging and/or discharging rates may be adjusted based on battery temperature to prevent damage to the cells of the battery and/or to improve charging efficiency. Some battery systems utilize temperature sensors that are attached to a busbar using adhesive. Wiring is routed to a controller that monitors the temperature sensor.

Flex foil substrates include a bottom layer, a middle layer including conductive material such as copper (Cu) or aluminum (Al) defining a trace pattern including traces and a cover layer arranged on top of the middle layer. The traces of the flex foil substrate are used to replace wires of the wiring harnesses. The flex foil substrate can be used to connect temperature sensos to the battery and to sense busbar voltage.

Placement and/or attachment of the temperature sensor to the busbar using the flex foil substrate can be problematic for several reasons. In some examples, the flex foil substrate is ultrasonically welded to the busbars. When the temperature sensor is arranged near an ultrasonic weld location to the busbar or between a flex foil substrate and the busbar, external forces can cause the temperature sensor to contact the busbar, which may lead to a short circuit.

Systems and methods according to the present disclosure relate to flex foil substrates attaching one or more temperature sensors in locations that are spaced apart from the weld locations to the busbar (for voltage sensing). In some examples, the flex foil substrate connects the temperature sensors to a top surface of the busbars whereas the flex foil substrate is also connected to bottom surfaces of the busbars to sense voltage. This arrangement tends to protect the temperature sensor from damage and allows accurate measurement of battery temperature. In some examples, the battery includes aluminum busbars and the flex foil substrate includes aluminum conductive traces that have been milled using a dry milling process.

The conductive layer of the flex foil substrate is formed using a dry milling process that creates the traces of the trace pattern. A cover layer is laid over the traces. The openings are pre-cut or otherwise formed in the cover layer in locations corresponding to locations for welding and/or the temperature sensors. The temperature sensors are attached to the flex foil substrate after the milling process and application of the cover layer. The cell voltage sensing traces and the temperature sensing traces are combined on the common flex foil substrate. Use of the flex foil substrate reduces wires and other components that are required for connectivity. In addition, use of the flex foil substrate also tends to increase reliability.

Figure 1:
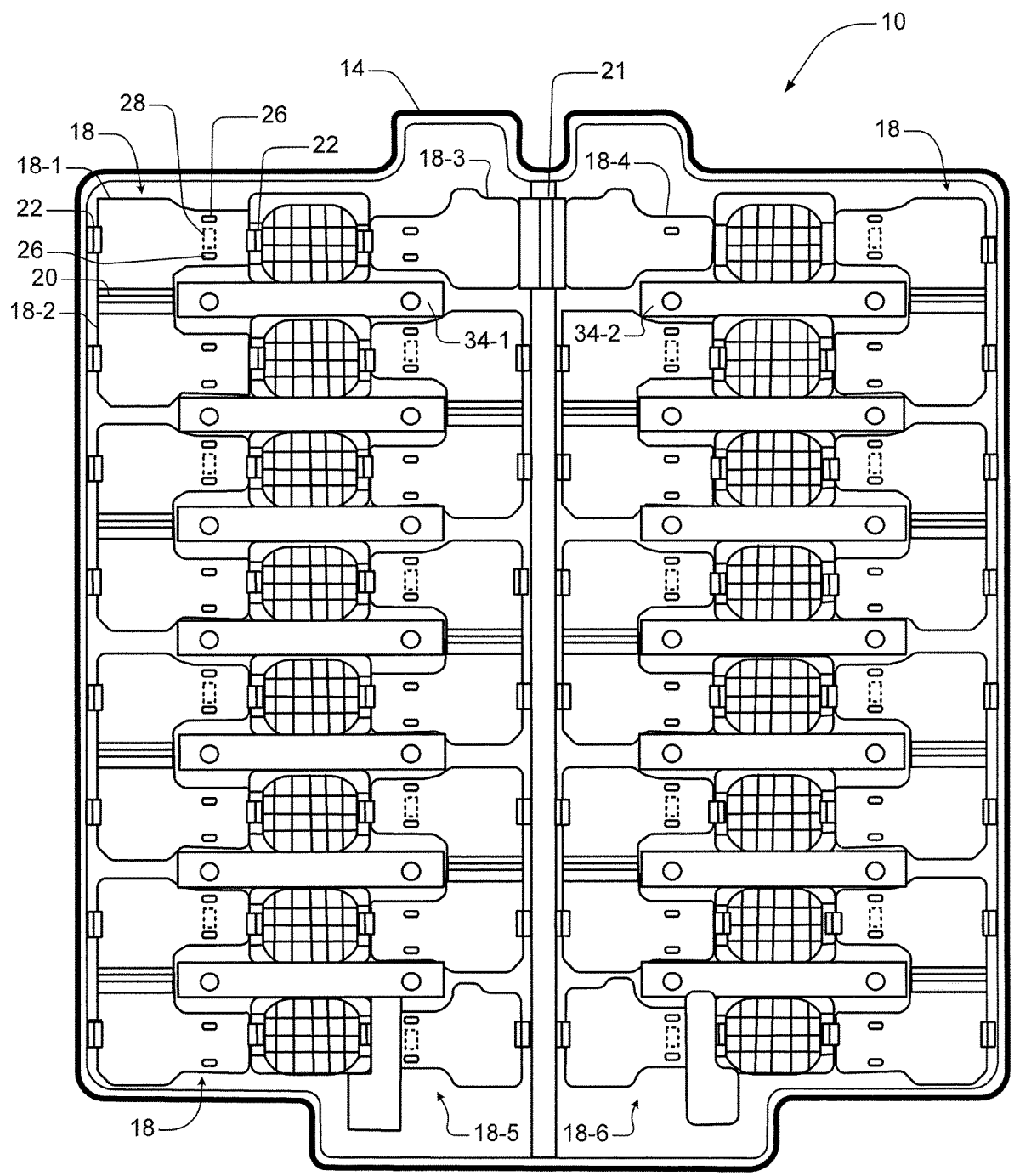
FIG. 1 is a plan view of an example of a battery connector assembly including a frame, busbars and a flex foil substrate according to the present disclosure.

Referring now to FIG. 1, a battery connector assembly 10 for a battery system is shown. In some examples, the battery system includes two or more rows of battery cells (not shown). In some examples, the rows of battery cells include 8 battery cells that are connected in series to the busbars and the rows of battery cells are also connected together in series to positive and negative battery terminals. As can be appreciated, the battery system described herein is for illustration purposes only and may include other arrangements, numbers of cells, and/or parallel and/or serial connections of the battery cells, etc.

The battery connector assembly 10 includes a frame 14, a plurality of busbars 18-1, 18-2, . . . (collectively busbars 18) attached to the frame 14, a first flex foil substrate 34-1, and a second flex foil substrate 34-2 (both may be generically identified as flex foil substrate 34). While the first and second flex foil substrates 34-1 and 34-2 are shown located below the busbars 18, the first and second flex foil substrates 34-1 and 34-2 can be located and/or attached above, below and/or above and below (e.g. FIG. 2) the substrate.

In some examples, the busbars 18 may be connected side-by-side with an expansion portion 20 located therebetween as shown at 18-1 and 18-2. The expansion portion 20 may include metal that is bent or curved to allow relative movement. In other examples, the busbars 18 may be connected end-to-end with an expansion portion 21 located therebetween as shown at 18-3 and 18-4. In some examples, the busbars 18 include individual or single busbars as shown at 18-5 and 18-6.

In some examples, one or more of the busbars 18 include one or more holes 26 passing therethrough from one surface thereof to an opposing surface thereof. An opposing surface of the busbars 18 may be attached to the flex foil substrate 34 at corresponding attachment locations 28. In some examples, the flex foil substrate 34 is attached using ultrasonic welding. The one or more holes 26 may be arranged adjacent to the attachment locations 28. In some examples, adhesive may be applied in selected ones of the holes 26 to provide strain relief at the attachment locations 28.

The frame 14 may include flexible tabs 22 to allow the busbars 18 to be snap-fit into the frame 14, retained and released if needed. In some examples, the flexible tabs 22 are located along opposing sides of the frame 14. Additional flexible tabs 22 are arranged in first and second rows adjacent to a center portion of the frame 14.

Figure 2:
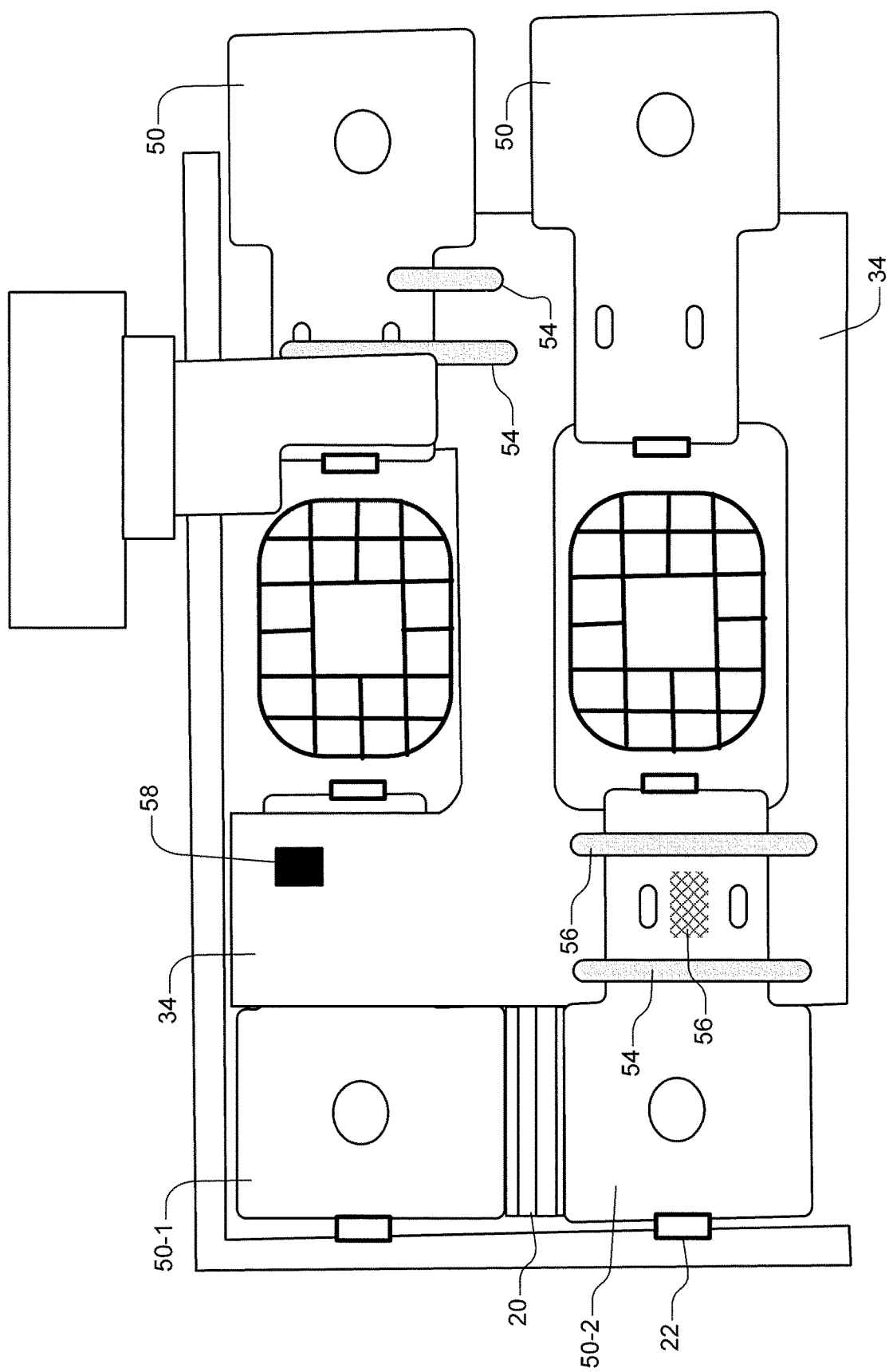
FIG. 2 is an enlarged partial plan view of an example of a battery connector assembly including a frame, busbars and a flex foil substrate according to the present disclosure.

Referring now to FIG. 2, the flex foil substrate 34 can be arranged such that one or more temperature sensors 58 can be attached to one or more of a plurality of busbars 50. The flex foil substrate 34 is arranged on top of a busbar 50-1 and below a busbar 50-2 (arranged adjacent to the busbar 50-1). The temperature sensor 58 is attached to a top surface of the flex foil substrate 34 above the busbar 50-1. Likewise, a busbar 50-2 is attached to a top surface of the flex foil substrate 34. In some examples, the flex foil substrate 34 is arranged under the busbar 50-2 and ultrasonically welded to a bottom surface of the busbar 50-2 as indicated at 56.

In some examples, adhesive 54 is deposited onto flex foil substrate 34, across the busbar 50-2 and onto the flex foil substrate 34 to secure the flex foil substrate 34 thereto. In some examples, the adhesive 54 is deposited adjacent to first and second sides of the ultrasonic weld 56.

Figure 3:
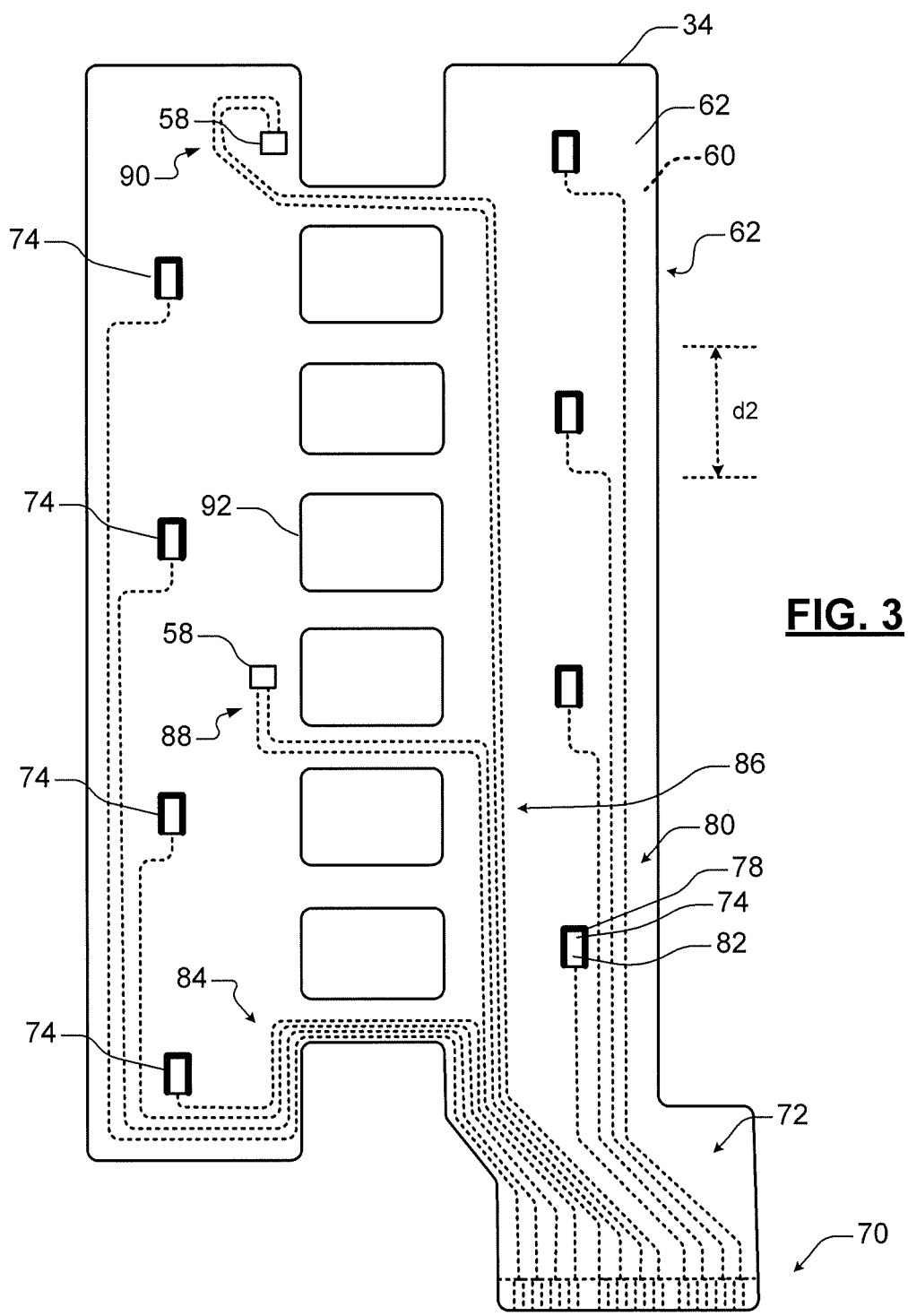
FIG. 3 is a plan view of an example of the flex foil substrate according to the present disclosure.

Referring now to FIG. 3, an example of the flex foil substrate 34 is shown. The flex foil substrate 34 includes a conductive layer 60 and insulating layers 62 (or cover layers) on one or both sides of the conductive layer 60. In some examples, the conductive layer 60 is made of metal such as Al or Cu and has a thickness in a range from 5 μm to 40 μm, although thicker and thinner traces can be used. In some examples, Cu having a thickness of 9 μm, 18 μm, or 35 μm, or Al having a thickness of 9 μm or 18 μm may be used. In some examples, the insulating layers 62 include film such as polyethylene terephthalate (PET), polyethylene naphthalate (PEN), or polyimide (PI), although other materials can be used.

In some locations, portions of the conductive layer 60 and/or the insulating layer 62 are removed using a dry milling process to create trace patterns and/or openings. A suitable example of a dry milling process is shown and described in U.S. Pat. No. 7,919,027, issued on Apr. 5, 2011 and entitled "Methods and Devices for Manufacturing of Electrical Components and Laminated Structures", which is hereby incorporated herein by reference in its entirety. During the dry milling process, a web of the flex foil substrate is fed between a milling wheel and a cliché.

The cliché includes a rotating drum and a flexible substrate attached to the rotating drum with a pattern including raised portions and non-raised portions. The substrate is attached to the drum. In some examples, the pattern is made using photolithography. The milling wheel is arranged on an opposite side of the web. The raised portions of the pattern on the cliché push the conductive layer into the milling wheel and the corresponding portions of the conductive layer are removed. A similar approach can be used to mill the insulating layer. The conductive layer that remains is thereby patterned to provide traces, pads for fingers, etc. and intervening areas where the conductive layer is absent. After milling the conductive layer, an insulating or coverlay layer can be arranged over the conductive layer. One or more additional milling steps may be used to create openings that expose portions of the traces.

The flex foil substrate 34 includes a connection location 70 and traces 72 that extend from the connection location 70 to other locations of the flex foil substrate 34. The insulating layer 62 is removed from one side of the conductive layer 60 at the connection location 70 to allow external connections to the traces 72. In some examples, a plurality of fingers 74 are kiss cut in the flex foil substrate 34 and the insulating layer 62 is removed from the plurality of fingers 74 as indicated at 82. Edges of the plurality of fingers 74 are cut at 78 to release a portion of the plurality of fingers 74 from the flex foil substrate 34 to allow attachment to the busbars 18 by ultrasonic welding, conductive adhesive, and/or adhesive. In FIG. 3, the plurality of fingers 74 have a rectangular shape and the cut has a "U"-shaped to release three edges of the plurality of fingers 74. However, other shapes can be used.

In some examples, a first group of the traces 80 extend to the plurality of fingers 74 located along one side of the flex foil substrate 34. A second group of the traces 84 extend to the plurality of fingers 74 located along another side of the flex foil substrate 34. A third group of traces 86 extend to a first location 88 and a second location 90. In some examples, the temperature sensors 58 or other sensors may be arranged at the first and second locations 88, 90 or in other locations. The flex foil substrate 34 may also include one or more spaced holes 92 to allow airflow through the frame 14 and the flex foil substrate 34.

Referring now to FIGS. 4A and 4B, external connection to the flex foil substrate is shown. In FIG. 4A, a printed circuit board 150 is shown. In FIG. 4B, the printed circuit board 150 is shown attached to the flex foil substrate 34. The printed circuit board 150 includes traces 154 that align with the traces 72 of the flex foil substrate 34 at the connection location 70. Conductive adhesive 164 is applied between an end of the flex foil substrate 34 including the connection location 70 and the printed circuit board 150 (with the traces 154 and 72 aligned). In some example, the conductive adhesive 164 conducts in one direction (corresponding to a direction of applied pressure) and includes epoxy resin. In some examples, Delo® Monopox heat-curing adhesive is used. Heat and pressure in a direction transverse to the printed circuit board 150 is applied for a predetermined period to cure the adhesive. The printed circuit board 150 may include plated vias 160 to provide external connections.

Referring now to FIG. 5, a battery system 170 includes a battery enclosure 172 enclosing a plurality of battery cells 174. The frame 14 includes the busbars 18 (not shown in FIG. 5) that are attached to the plurality of battery cells 174 in the battery enclosure 172. A connector 176 provides a connection to the battery system 170 for parameter sensing components and/or for cell balancing (described above). Terminal connections (not shown) are also connected to the battery system 170.

Referring now to FIG. 6, a flex foil substrate circuit 200 includes a flex foil substrate 212 that provides a connection to a temperature sensor 214. While the flex foil substrate 212 is shown to include a single temperature sensor 214 connected thereto, the flex foil substrate 212 can provide connection to any number of temperature sensors 214. In some examples, the flex foil substrate circuit 200 may be used to measure local temperatures in a battery system. For example, the flex foil substrate circuit 200 may be connected to one or more busbars of a battery system as described herein (and/or any other component of a battery system).

A first busbar 220-1 is attached on a bottom facing surface of a cover layer 224 of the flex foil substrate 212. In some examples, adhesive 226 is used to physically attach the flex foil substrate 212 to the first busbar 220-1. In some examples, the adhesive 226 includes pressure sensitive adhesive (PSA), although other types of adhesive may be used. A second busbar 220-2 is attached on the same side of the flex foil substrate 212 at a location spaced from the first busbar 220-1. In some examples, the flex foil substrate 212 is attached to a top surface of the first busbar 220-1 and a bottom surface of the second busbar 220-2. While the first and second busbars 220-1 and 220-2 are shown immediately adjacent to one another, the temperature sensing connection and the voltage sensing connection need not be made on immediately adjacent busbars.

The flex foil substrate 212 includes a conductive layer 230. The conductive layer 230 defines a trace pattern 232 that includes a plurality of traces. In some examples, the traces of the trace pattern 232 are insulated from one another and define independent electrical connections. The conductive layer 230 is sandwiched between the cover layer 224 (on bottom) and a cover layer 238 (on top). In some examples, the cover layers 224 and/or 238 are made of an insulating film such as polyethylene terephthalate (PET), polyethylene naphthalate (PEN), or polyimide (PI), although other materials can be used.

The cover layer 238 further defines one or more openings 250 on a top facing surface thereof, to allow attachment to the traces of the trace pattern 232. For example, one or more of the temperature sensors 214 can be attached to traces of the flex foil substrate 212.

The one or more openings 250 are located in areas where connections are needed to the traces of the trace pattern 232. In some examples, the trace pattern 232 of the flex foil substrate 212 is dry milled. Generally, a dry milled trace pattern include traces with milled edges that slope outwardly relative to the opening as a distance from an underlying layer increases. In contrast, etched trace patterns will generally have etched edges that slope inwardly relative to the opening as a distance from an underlying layer increases.

For example, first and second traces 254 and 256 of the trace pattern 232 are exposed in the opening 250. In some examples, the first and second traces 254 and 256 of the trace pattern 232 are routed back to a component such as the printed circuit board 150 described above.

For example, first and second conductors 260 and 262 of a temperature sensor 214 are attached to the first and second traces 254 and 256, respectively, of the flex foil substrate 212 in the opening 250. In some examples, electrically conductive adhesive 266 connects the first and second traces 254 and 256 of the flex foil substrate 212 to the first and second conductors 260 and 262 of the temperature sensor 214. In some examples, the temperature sensor 214 comprises a negative temperature coefficient (NTC) temperature sensor.

A protective layer 272 is arranged over the temperature sensor 214 and the one or more openings 250 in the flex foil substrate 212. In some examples, the protective layer 272 comprises a cover layer such as those described above or a protective coating. In some examples, the protective coating comprises a conformal spray coating.

The flex foil substrate 212 includes an opening 282 in the cover layer 238 exposing a third trace 280. In some examples, the third trace 280 is connected to a bottom-facing surface of the second busbar 220-2. In some examples, the third trace 280 is ultrasonically welded to a bottom-facing surface of the second busbar 220-2.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A sensing system for a battery, comprising:
    a flex foil substrate including:
        a first cover layer;
        a conductive layer defining a trace pattern including traces; and
        a second cover layer defining a first opening and a second opening,
        wherein the conductive layer is sandwiched between the first cover layer and the second cover layer, wherein the first opening exposes a first trace and a second trace of the trace pattern, and wherein the second opening exposes a third trace of the trace pattern;
    a first busbar attached to the first cover layer, wherein the flex foil substrate is arranged in contact with a top surface of the first busbar;
    a temperature sensor connected to the first trace and the second trace of the trace pattern in the first opening; and
    a second busbar having a bottom surface connected to the third trace through the second opening.

2. The sensing system of claim 1, wherein the first busbar is attached to the first cover layer of the flex foil substrate using pressure sensitive adhesive.

3. The sensing system of claim 1, wherein the temperature sensor includes a negative temperature coefficient (NTC) temperature sensor.

4. The sensing system of claim 1, wherein the temperature sensor is attached to the first trace and the second trace using conductive adhesive.

5. The sensing system of claim 1, further comprising a protective layer arranged over the temperature sensor and the first opening in the flex foil substrate.

6. The sensing system of claim 5, wherein the protective layer comprises a coating.

7. The sensing system of claim 5, wherein the protective layer comprises a conformal coating.

8. A battery system comprising:
    a frame;
    a plurality of busbars including the first and second busbars, wherein the plurality of busbars are attached to the frame; and
    the sensing system of claim 1.

9. The sensing system of claim 1, wherein the third trace of the flex foil substrate is ultrasonically welded to the second busbar.

10. The sensing system of claim 9, wherein the first and second busbars are arranged adjacent to one another.

11. A connector for a battery system comprising:
    a frame;
    a plurality of busbars attached to the frame;
    a flex foil substrate including:
        a first cover layer;
        a second cover layer;
        a conductive layer defining a trace pattern including traces and sandwiched between the first cover layer and the second cover layer;
        a first opening in the second cover layer exposing a first trace and a second trace of the trace pattern;
        a second opening in the second cover layer exposing a third trace of the trace pattern;
        an outer surface of the first cover layer attached to a first surface of a first one of the plurality of busbars; and
        the third trace of the flex foil substrate in the second opening is connected to a second surface of a second one of the plurality of busbars; and
    a temperature sensor connected in the first opening to the first trace and the second trace of the trace pattern wherein the second surface of the second one of the plurality of busbars is on a battery-facing side of the connector and the first surface of the first one of the plurality of busbars is on a side opposite to the battery-facing side of the connector.

12. The connector of claim 11, wherein the first one of the plurality of busbars is attached to the first cover layer of the flex foil substrate using pressure sensitive adhesive.

13. The connector of claim 11, wherein the temperature sensor includes a negative temperature coefficient (NTC) temperature sensor.

14. The connector of claim 11, wherein the temperature sensor is attached to the first trace and the second trace using conductive adhesive.

15. The connector of claim 11, further comprising a protective layer arranged over the temperature sensor and the first opening in the flex foil substrate.

16. The connector of claim 15, wherein the protective layer comprises a coating.

17. The connector of claim 15, wherein the protective layer comprises a conformal coating.

\* \* \* \* \*